(12) United States Patent
Denny et al.

(10) Patent No.: US 12,539,044 B2
(45) Date of Patent: Feb. 3, 2026

(54) SYSTEM AND METHOD FOR EARLY IDENTIFICATION OF DIFFICULT VENOUS ACCESS OF A PATIENT

(71) Applicant: Bard Access Systems, Inc., Salt Lake City, UT (US)

(72) Inventors: Gerald Blalock Denny, Salt Lake City, UT (US); Shayne Messerly, Kaysville, UT (US); Jeffrey Charles O'Bryan, Murray, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 310 days.

(21) Appl. No.: 18/209,394

(22) Filed: Jun. 13, 2023

(65) Prior Publication Data
US 2024/0415392 A1   Dec. 19, 2024

(51) Int. Cl.
*A61B 5/00* (2006.01)
*A61B 5/02* (2006.01)
(Continued)

(52) U.S. Cl.
CPC .......... *A61B 5/02007* (2013.01); *A61B 5/029* (2013.01); *A61B 5/6852* (2013.01);
(Continued)

(58) Field of Classification Search
None
See application file for complete search history.

(56) References Cited

U.S. PATENT DOCUMENTS

2022/0160434 A1   5/2022 Messerly et al.
2022/0343494 A1*  10/2022 Dhatt ................ A61B 8/468
(Continued)

FOREIGN PATENT DOCUMENTS

CN    112932482 A   6/2021
EP      4173585 A1   5/2023

OTHER PUBLICATIONS

Brattain Laura et al AI-Enabled Ultrasound-Guided Handheld Robotic Device for Femoral Vascular Access 14-17 BIOSENSORS vol. 11 No. 12 Dec. 18, 2021 Dec. 18, 2021 pp. 1-20 XP093188786 CH ISSN 2079-6374 DOI 10.3390/bios11120522 the whole document.
(Continued)

*Primary Examiner* — Dov Popovici
(74) *Attorney, Agent, or Firm* — Rutan & Tucker LLP (57) ABSTRACT

A system and method for determining a difficult venous access of a patient. Logic processes meta data acquired by a vasculature assessment device coupled with the patient. The meta data, e.g., vessel diameter, vessel depth, vessel wall thickness, vessel wall elasticity, tissue elasticity, tissue profusion, blood flow rate, or hydration level. The logic further determines a difficult venous access by performing an algorithm on the meta data. The algorithm is defined utilizing machine learning techniques applied to an ongoing collection data sets acquired from a plurality of systems across a plurality of patients undergoing catheter insertion events. The data set may also include patient data such as weight, age, etc. The vasculature assessment device may include ultrasound imaging, infrared imaging, molecular imaging, Raman spectroscopy, or optical coherence tomography to acquire one or both of three-dimensional imaging data and the meta data.

20 Claims, 7 Drawing Sheets

(51) Int. Cl.
  *A61B 5/029* (2006.01)
  *G06T 7/00* (2017.01)
  *A61B 8/12* (2006.01)
(52) U.S. Cl.
  CPC ................. *G06T 7/00* (2013.01); *A61B 8/12* (2013.01); *G06T 2207/30101* (2013.01)

(56) References Cited

U.S. PATENT DOCUMENTS

| | | | |
|---|---|---|---|
| 2023/0329748 A1* | 10/2023 | Sowards | A61B 8/488 |
| 2024/0008894 A1* | 1/2024 | Sowards | A61B 8/4488 |
| 2024/0408370 A1* | 12/2024 | Saptharishi | A61M 5/16804 |
| 2025/0041515 A1* | 2/2025 | Messerly | A61M 5/158 |

OTHER PUBLICATIONS

PCT/US2024/033661 filed Jun. 12, 2024 International Search Report and Written Opinion dated Aug. 13, 2024.

* cited by examiner

| RECORD # | 1 | 2 | 3 | 4 | 5 | 6 | >> |
|---|---|---|---|---|---|---|---|
| META DATA — TARGET BLOOD VESSEL | NAME | | | | | | |
| VESSEL DIAMETER | VALUE | | | | | | |
| VESSEL DEPTH | VALUE | | | | | | |
| BLOOD FLOW RATE | VALUE | | | | | | |
| VESSEL WALL THICKNESS | VALUE | | | | | | |
| VESSEL WALL ELASTICITY | VALUE | | | | | | |
| TISSUE ELASTICITY | VALUE | | | | | | |
| TISSUE PROFUSION | VALUE | | | | | | |
| HYDRATION LEVEL | VALUE | | | | | | |
| PATIENT DATA — WEIGHT | VALUE | | | | | | |
| GENDER | VALUE | | | | | | |
| AGE | VALUE | | | | | | |
| RACE | VALUE | | | | | | |
| BMI | VALUE | | | | | | |
| LIMB GIRTH | VALUE | | | | | | |
| VASCULAR ACCESS DATA — BLOOD VESSEL | NAME | | | | | | |
| CATHETER | TYPE/SIZE | | | | | | |
| CATHETER INSERTION DEVICE | TYPE/MODEL | | | | | | |
| INSERTION SITE | NAME | | | | | | |
| ANGLE OF INSERTION | VALUE | | | | | | |
| DVA RANKING | RANK | | | | | | |

SYSTEM AND METHOD FOR EARLY IDENTIFICATION OF DIFFICULT VENOUS ACCESS OF A PATIENT

BACKGROUND

Nurses commonly face challenges placing peripheral intravenous (IV) lines in adults and children, a situation described as difficult venous access (DVA). Multiple venipuncture attempts can heighten patient anxiety and suffering, delay vital treatment, and increase costs. Numerous factors such as small, fragile or hidden veins can predispose patients to DVA, and collapsed veins due to dehydration are especially problematic. Multiple placement attempts can worsen "needle phobia" since subsequent venipunctures are often more painful and are associated with an increased incidence of extravasation, vascular perforation causing hematoma or hemorrhage, and phlebitis. Nurses encounter DVA across a wide variety of clinical settings, including emergency medical transport, emergency department, hospital, clinician's office, long-term care facility, hospice, and home care. There is, however, no assessment scale to predict the degree of difficulty in placing peripheral IVs and no consensus guidelines on preventing or managing these challenges. If patients with potential DVA can be identified early in the course of treatment, i.e., before the catheter insertion event, nurses have time to adjust their approach and employ special techniques to enhance venous access and improve cannulation success rates. This, in turn, reduces the emotional and financial burdens associated with repeated failed attempts to place an IV line.

Disclosed herein are systems and methods for early identification of difficult venous access.

SUMMARY

Disclosed herein is a medical system that, according to some embodiments, includes a vascular assessment device configured to acquire raw image data of a vasculature of the patient and a system module having a console coupled with the vascular assessment device. The console includes a processor and a memory having logic stored thereon that, when executed by the processor, performs operations of the system that include (i) receiving the raw image data from the vascular assessment device; determining meta data for the vasculature from the raw image data; and applying a trained machine learning (ML) model to the meta data to determine a difficult venous access (DVA) assessment for the vasculature.

In some embodiments, the operations further include determining three-dimensional (3D) imaging data from the raw image data and applying the trained ML model to the 3D imaging data in combination with the meta data to determine the DVA assessment.

In some embodiments, the operations further include determining a map of the vasculature from the 3D imaging data and depicting the map of the vasculature on a display of the system module.

In some embodiments, the vascular assessment device utilizes one or more of ultrasound imaging, infrared imaging, molecular imaging, Raman spectroscopy, or optical coherence tomography to acquire the raw image data.

In some embodiments, the meta data include one or more of a vessel diameter, a vessel depth, a blood flow rate, a blood flow direction, a vessel wall thickness, a vessel wall elasticity, a tissue elasticity, a tissue profusion, or a hydration level.

In some embodiments, the operations further include providing a DVA assessment report to a clinician, the DVA assessment report including one or more of a subset of the meta data, a suggested catheter size, a suggested insertion angle, a suggested catheter insertion device, or a DVA score.

In some embodiments, the suggested catheter insertion device is chosen from a list of catheter insertion devices stored in the memory.

In some embodiments, the system module is communicatively coupled with an automated or semi-automated catheter insertion device, and the operations include transmitting the DVA assessment to the automated or semi-automated catheter insertion device for utilization during catheter insertion.

In some embodiments, the system module is communicatively coupled with an electronic medical record (EMR) system such that the system module exchanges information with an EMR for the patient. In some embodiments, exchanging information with the EMR includes transmitting the DVA assessment to the EMR system.

In some embodiments, the operations further include (i) receiving patient data for the patient from the EMR system, where the patient includes at least one of a weight, gender, age, race, or body mass index of the patient; and (ii) applying the trained ML model to the patient data in combination with the 3D imaging data and the meta data to determine the DVA assessment.

In some embodiments, the operations further include (i) identifying multiple locations along the vasculature; (ii) receiving the raw image data from the vascular assessment device for each identified location; (iii) determining meta data for each identified location; and (iv) applying the trained ML model to the meta data for each identified location to determine a DVA assessment for each identified location.

In some embodiments, the system module is communicatively coupled with an external computing device having ML logic stored in memory that when executed by processors performs ML operations that include receiving by the external computing device a plurality of historical DVA assessment data sets, where each historical DVA assessment data set includes a DVA assessment originating from raw image data obtained by one of a plurality of vascular assessment devices from a historical patient and an independent DVA assessment resulting from the actual placement of the catheter within the historical patient. In such embodiments, the ML operations further include applying a ML algorithm to the plurality of historical DVA assessment data sets to define the trained ML model, and the logic operations of the system module further include receiving the trained ML model from the external computing device.

In some embodiments, the external computing device is communicatively coupled with the EMR system, and the ML operations further include receiving the independent DVA assessment from the EMR system.

In some embodiments, the operations of the system module further include receiving the trained ML model from the external computing device.

Also disclosed herein is a system method of determining a DVA assessment of a vasculature of a patient that, according to some embodiments, includes receiving a plurality of historical DVA assessment data sets, where each historical DVA assessment data set includes meta data and 3D imaging data determined from raw image data acquired from a historical patient by a vascular assessment device of one of a plurality of DVA assessment systems; and a corresponding independent DVA assessment resulting from the actual placement of the catheter within the historical patient, where the corresponding independent DVA assessment is recorded in an EMR for the historical patient. The system method further includes (i) applying a ML algorithm to the plurality of historical DVA assessment data sets to train an ML model that relates the meta data and 3D imaging data to the corresponding independent DVA assessments across the plurality of historical DVA assessment data sets; (ii) acquiring, by a vascular assessment device of one of a plurality of DVA assessment systems, instant raw image data of a vasculature of a current patient; (iii) determining instant meta data and instant 3D imaging data from the instant raw image data; (iv) applying the trained ML model to the instant meta data and the instant 3D imaging data to determine an instant DVA assessment of the vasculature of the current patient, where the instant DVA assessment includes a predicted scoring of the instant meta data and the instant 3D imaging data.

In some embodiments, the vascular assessment device utilizes one or more of ultrasound imaging, infrared imaging, molecular imaging, Raman spectroscopy, or optical coherence tomography to acquire the meta data.

In some embodiments, the meta data include one or more of a vessel diameter, a vessel depth, a blood flow rate, a vessel wall thickness, a vessel wall elasticity, a tissue elasticity, a tissue profusion, or a hydration level, and in some embodiments, the DVA assessment includes one or more of a suggested catheter size, a suggested insertion angle, a suggested catheter insertion device, or a DVA score.

In some embodiments, the system method further includes retraining the trained machine learning model using the plurality of historical DVA assessment data sets and the predicted scoring of the instant meta data and the instant 3D imaging data and along with an independent DVA assessment corresponding to the scoring of the instant meta data and the instant 3D imaging data.

These and other features of the concepts provided herein will become more apparent to those of skill in the art in view of the accompanying drawings and following description, which describe particular embodiments of such concepts in greater detail.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise. For example, the "vascular parameter" a used herein may one individual vascular parameter or a combination of plurality of individual vascular parameters.

The phrases "connected to," "coupled with," and "in communication with" refer to any form of interaction between two or more entities, including but not limited to mechanical, electrical, magnetic, electromagnetic, fluid, wireless, and thermal interaction. Two components may be coupled with each other even though they are not in direct contact with each other. For example, two components may be coupled with each other through an intermediate component.

The term "logic" may be representative of hardware, firmware or software that is configured to perform one or more functions. As hardware, the term logic may refer to or include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the term logic may refer to or include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic may be stored in persistent storage.

Unless defined otherwise, all technical and scientific terms used herein have the same meaning as commonly understood by those of ordinary skill in the art.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method. Additionally, all embodiments disclosed herein are combinable and/or interchangeable unless stated otherwise or such combination or interchange would be contrary to the stated operability of either embodiment.

Figure 1:
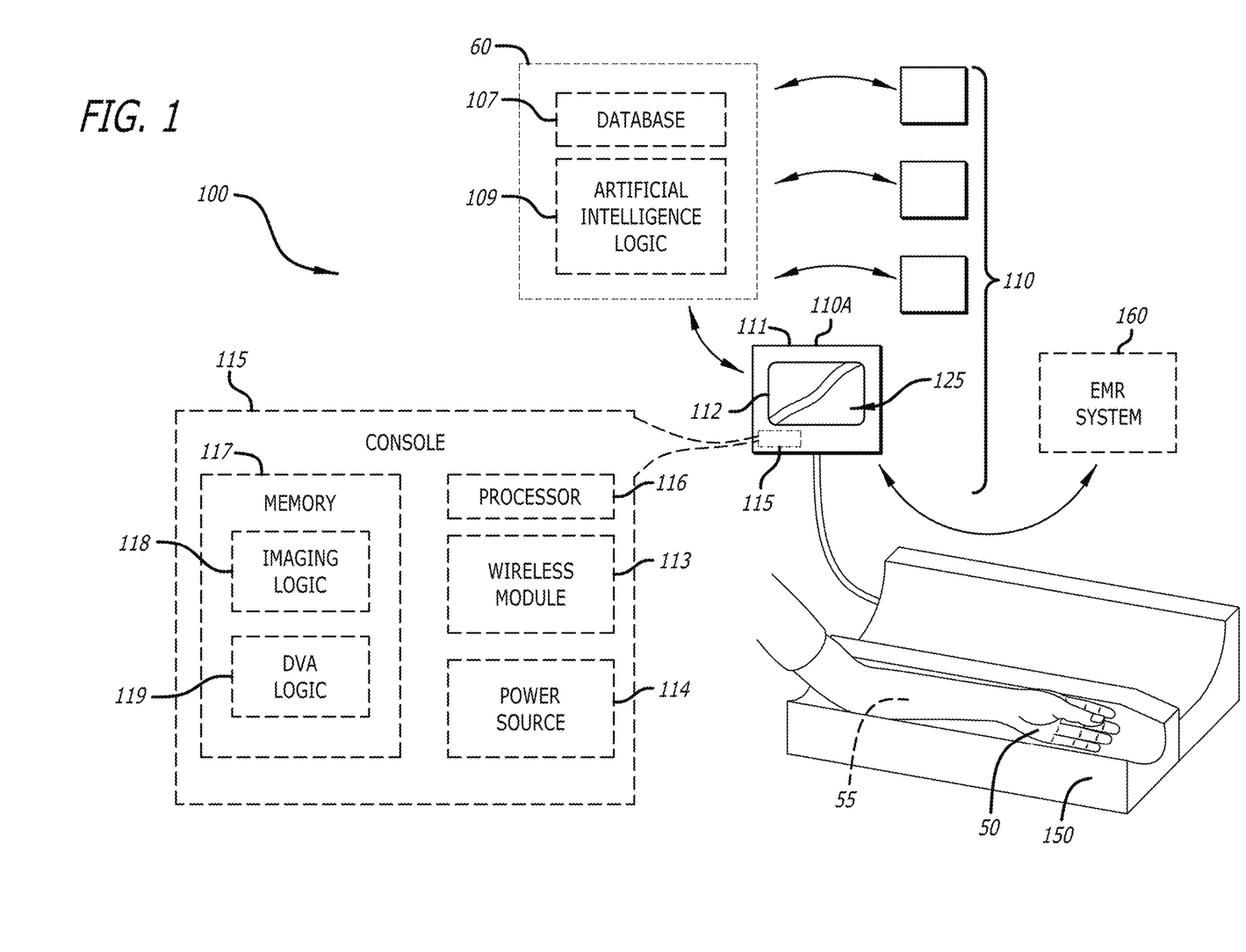
FIG. 1 illustrates a medical system configured to determine difficult venous access (DVA) of a patient, in accordance with some embodiments.

FIG. 1 illustrates a medical system 100 configured to determine (i.e., identify or diagnose) difficult venous access of a patient, according to some embodiments. In some embodiments, the system 100 may determine that accessing a vein may be difficult or require special tools, devices, or procedures to successfully place a catheter (or other medical device) within a vein and provide a notification accordingly. The medical system 100 generally includes a plurality of difficult venous access (DVA) assessment systems 110 communicatively coupled with an external computing device 60. The external computing device 60 may be any suitable computing device, such as a network server, for example. In some embodiments, the external computing device 60 may be coupled with an electronic medical record (EMR) system 160. A machine learning (ML) logic 109 including a machine learning algorithm and a database 107 are stored in memory (e.g., a non-transitory computer-readable medium) of the external computing device 60.

The DVA assessment system (system) 110A, which is one of the DVA assessment systems 110, is shown in use with a patient 50 undergoing a DVA assessment process. The system 110A is generally configured to obtain a map of a vasculature 55 of the patient 50 and acquire meta data pertaining to the vasculature 55. The system 110A (as with each of the systems 110) includes a system module 111 coupled with a vasculature assessment device (device) 150. The device 150 is configured to acquire raw image data and provide the raw image data to the system module 111. Logic of the system module 111 may then determine three-dimensional (3D) imaging data of the vasculature 55 from the raw image data from which the map of the vasculature 55 may be determined. Logic of the system module 111 is also configured to determine meta data pertaining to the vasculature 55 from the raw image data. The map of the vasculature 55 may include the identification of multiple blood vessels available for access. The meta data may include one or more of a vessel diameter, a vessel depth, a blood flow rate, a vessel wall thickness, a vessel wall elasticity, a tissue elasticity, a tissue profusion, or a hydration level.

The device 150 may be operatively coupled with the patient 50 in any suitable fashion. In some embodiments, the device 150 may surround or partially surround a limb of the patient 50, where the vasculature 55 extends along the limb. In some embodiments, the device 150 may include operative physical contact with the patient, such as via a probe, for example. The device 150 may include a one or more of any suitable technologies configured to obtain the raw image data. In some embodiments, the suitable technologies may include ultrasound imaging, infrared imaging, molecular imaging, Raman spectroscopy, or optical coherence tomography to acquire the raw image data.

The system 110A includes a console 115 and the device 150 is communicatively coupled with the console 115, such as via a wired connection or a wireless connection, for example. In the illustrated embodiment, the console 115 includes a processor (or multiple processors) 116 that executes logic stored in a memory 117 (e.g., a non-transitory computer-readable medium) such as the imaging logic 118 and the DVA logic 119. A power source 114 of the console 115 may include an external source (i.e., a facility power source) or a battery. The console 115 may include a wireless module 113 to facilitate wireless communication between the device 150 and the system module 110A and/or between the system module 110A and the external computing device 60. In some embodiments, system 110A may include (or be coupled with) a display 112 (e.g., a graphical user interface) configured to display notification information and/or receive input from a clinician.

Figure 5A:
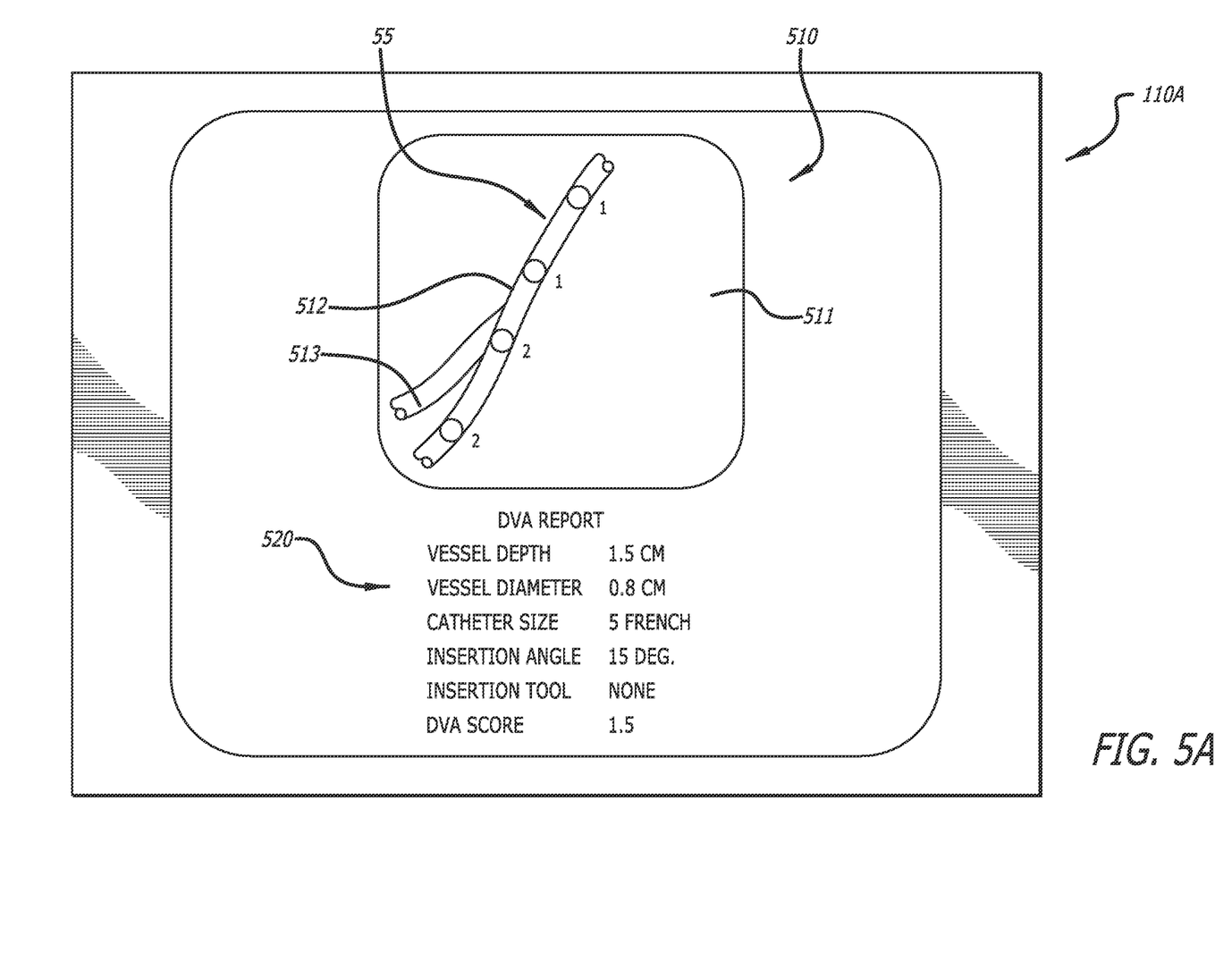
FIGS. 5A-5C illustrate exemplary screen shots of the medical system of FIG. 1
Figure 5B:
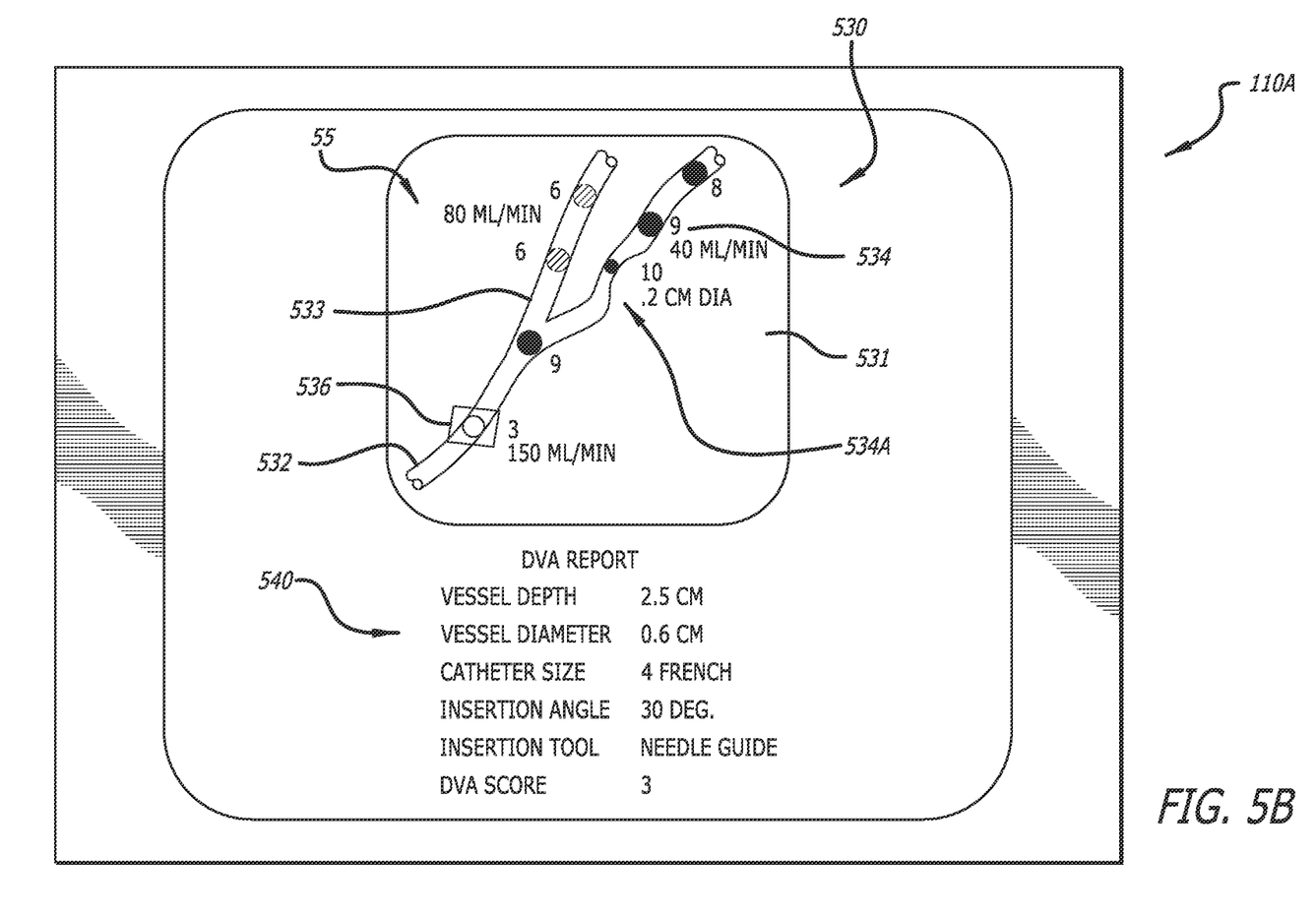
Figure 5C:
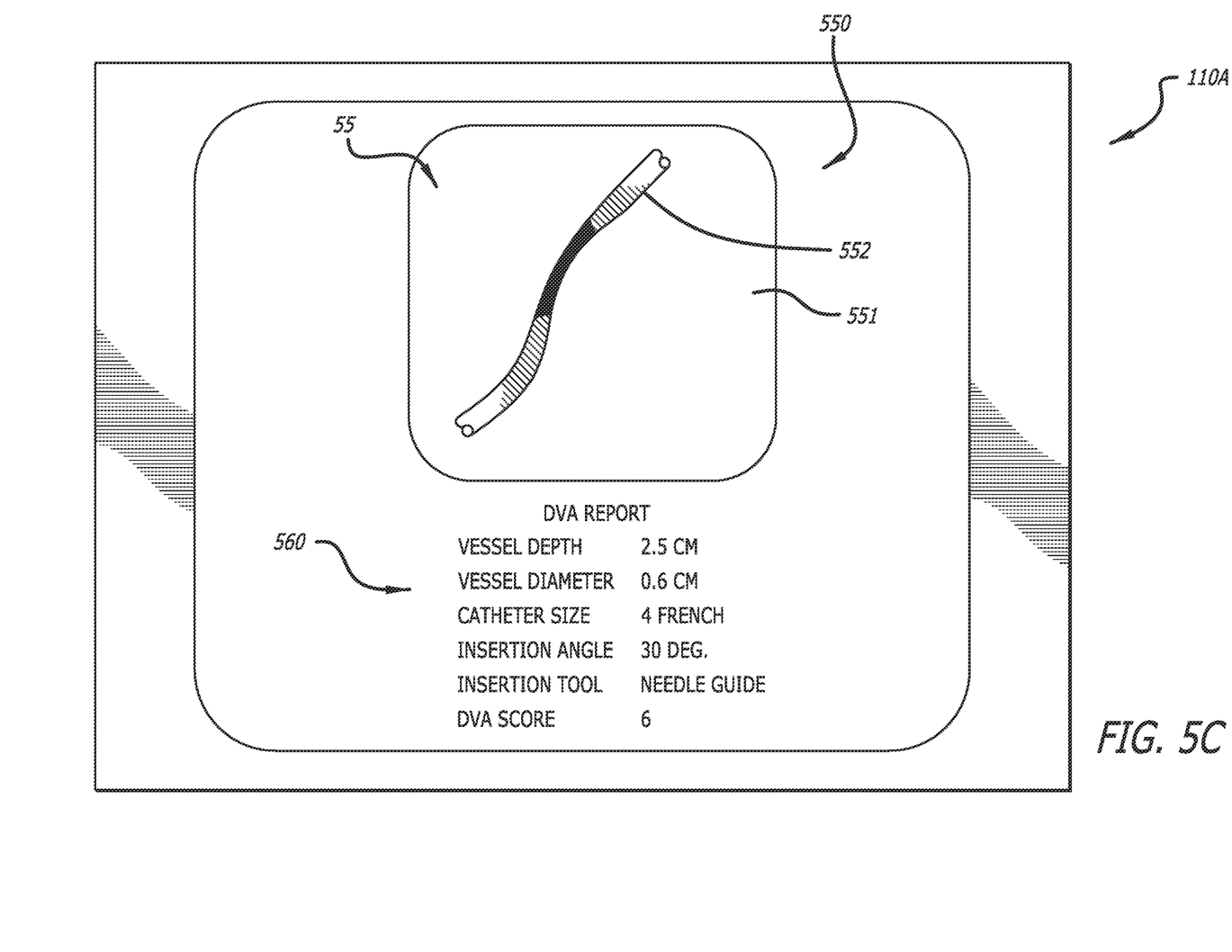

In some embodiments, the imaging logic 118 is configured to receive the raw image data from the device 150 and portray an image (or map) 125 of the vasculature 55 on the display 112. As such, the image 125 may enable the clinician to identify a target blood vessel (e.g., a target vein) or choose a different target blood vessel. The image 125 may enable the clinician to identify an insertion site along a target blood vessel. Similarly, the image 125 may enable the clinician to identify any anomalies associated with the vasculature 55, such as a stenosis or blockage of the blood vessel, for example. In some embodiments, the image 125 may portray the vasculature 55 with respect to other anatomical elements, such as bones, nerves, or other blood vessels, for example. Examples of the image (map) 125 are illustrated in FIGS. 5A-5C.

The DVA logic 119 logic is generally configured to receive the raw image data from the device 150 and determine the meta data therefrom. The DVA logic 119 logic may also be configured to determine a difficult venous access (DVA) assessment for the vasculature 55. The meta data may include data pertaining to accessing the vasculature 55. As such, the meta data may include attributes of the vasculature 55 (or more specifically a target blood vessel) and attributes of tissue or other anatomical elements in the vicinity of the vasculature 55.

In some embodiments, the meta data may additionally include patient data, which, in some embodiments, may be input by the clinician or acquired from the EMR system 160 for the patient 50. The patient data may include any suitable patient parameters, such as height, weight, gender, age, race, limb girth, or body mass index (BMI), for example. Other patient conditions may also be included, such as blood pressure, pulse rate, medications, or body temperature, for example.

The DVA assessment may include any information that helps the clinician determine one or more suitable (or optimal) procedures, tools, or devices, for accessing the vasculature 55. In some embodiments, the DVA assessment may include a target blood vessel, an insertion site, and/or an angle of insertion for a needle, or a defined catheter. In some embodiments, the DVA assessment may include a suggested catheter type or size. In some embodiments, the DVA assessment may include a suggested catheter insertion tool or system (e.g., an automated or semi-automated catheter insertion system). The DVA assessment may include a difficulty ranking, such as simple, medium, difficult, or extremely difficult or a numerical score, for example.

The DVA logic 119 may provide a notification or report to a clinician. For example, the DVA logic 119 may provide a visual report on the display 112. The DVA logic 119 may also provide an alert or warning in the form of a visual or audible indication in accordance with the DVA assessment. In some embodiments, DVA logic 119 may transmit the DVA assessment to the EMR for the patient 50. As such, the DVA assessment may enable a clinician to perform a subsequent catheter insertion for the patient 50.

In the illustrated embodiment, the DVA logic 119 determines the DVA assessment by utilizing machine learning techniques, e.g., applying the trained machine learning model on particular inputs, which may include all or any subset of the 3D imaging data and/or meta data. In some embodiments, the trained machine learning model may be stored in the memory 117. In other embodiments, the trained machine learning model may be stored in the data base 107 of the external computing device 60 and performed by the external computing device 60. In such embodiments, the DVA logic 119 may transmit the 3D imaging data and/or meta data to the external computing device 60 and receive the DVA assessment from the external computing device 60, where the DVA assessment may include point or location along patient vasculature predicted to be least difficult to access as determined by processing of the 3D imaging data and/or meta data by the trained machine learning model.

The ML logic 109, when executed by one or more processors, is generally configured to process historical data resulting in the trained machine learning model. The ML logic 109 receives as input historical data from a plurality of catheter placement events across a population of patients. In some embodiments, the external computing device 60 may be communicatively coupled with and configured to receive the historical data from the EMR system 160 and/or the plurality of the systems 110. The historical data for each catheter placement event generally includes the 3D imaging data, the meta data, and final catheter placement data. The historical data used to train the machine learning model may comprise sets of: (1) 3D imaging data, (2) meta data, and (3) an independent DVA assessment, i.e. a DVA assessment resulting from the actual placement of the catheter. In some instances, only one of the 3D imaging data and the meta data is utilized. As one detailed example, a series of points along a patient vasculature may be identified along with meta data for each point. The meta data for a particular point may include a vessel diameter, a vessel depth, a blood flow rate, a vessel wall thickness, a vessel wall elasticity, a tissue elasticity, a tissue profusion, or a hydration level and may generally be associated with patient data of the patient, such as any of a weight, gender, age, race, or body mass index of the patient.

The independent DVA assessment may include any relevant data or information related to the actual insertion of the catheter. For example, the relevant data or information may include that catheter size used. According to one embodiment, a list of available catheters (or catheter sizes) may be stored in the memory 117. As such, the DVA assessment may include a suggested catheter size (or model) as chosen from the list by the DVA logic 119 as a result of applying the trained ML model. In a similar fashion, the DVA assessment may include a suggested catheter insertion device and/or an angle of insertion.

In some embodiments, a catheter insertion device may be automated or semi-automated. In such embodiments, the catheter insertion device (or more specifically, the operation thereof) may be configured to utilize the meta data, the 3D imaging data, and/or DVA assessment to define settings or otherwise affect the operation of the catheter insertion device. As such, according to one embodiment, the system 100 may be configured to couple with and provide data to the catheter insertion device. By way of one example, the relevant data or information related to the actual insertion of the catheter may operational settings of the catheter insertion device and the DVA assessment may include the operational settings.

The raw image data may be obtained through deployment of any of the following medical systems: an ultrasound imaging system, an infrared imaging system, a molecular imaging system, a Raman spectroscopy system, and/or an optical coherence tomography system. For example, an ultrasound system may include an ultrasound probe configured project high-frequency sound waves through body tissue and receive echoed sound waves to create raw image data pertaining to vascular and/or other entomic elements of the patient. Logic executed by processors may then create an image (i.e., map) 125, suitable for rendering on the display 112, of the vasculature 55, where the image 125 may include attributes thereof, such as position or depth from the skin surface, blood vessel wall thickness, blood vessel size, or blood vessel shape, for example. The ultrasound system may also utilize doppler techniques to detect/determine motion of anatomical elements, such as a blood flow rate, or a pulsing of the blood vessel. Monitoring and/or analyzing the pulsing of the blood vessel, i.e., expanding and contracting due to pressure therewithin, can be utilized to indicate an elasticity or hardness of a blood vessel. Other systems (e.g., imaging systems) may utilize similar techniques raw data related to other attributes of the patient pertaining to the vasculature, such as a tissue perfusion or a hydration level, for example.

Thus, the ML logic 109 may apply a ML algorithm to the sets of 3D imaging data, meta data, and independent DVA assessment (which acts as a label as to whether a clinician successfully accessed the vasculature at the corresponding point) to generate the trained ML model, which may comprise a series of weighted features that, when applied to input of 3D imaging data and/or meta data, determines a score related to a predicted likelihood that vasculature access at the corresponding point would be successful in view of the historical data. It should be understood that the historical data may be stored in the memory 117. Although FIG. 1 illustrates that the database 107 and the ML logic 109 may be stored on the external computing device 60, in some embodiments, the database 107 and the ML logic 109 may be stored in the memory 117 of the console 115, such that the ML logic 109 is executable by the processor(s) 116.

Figure 2:
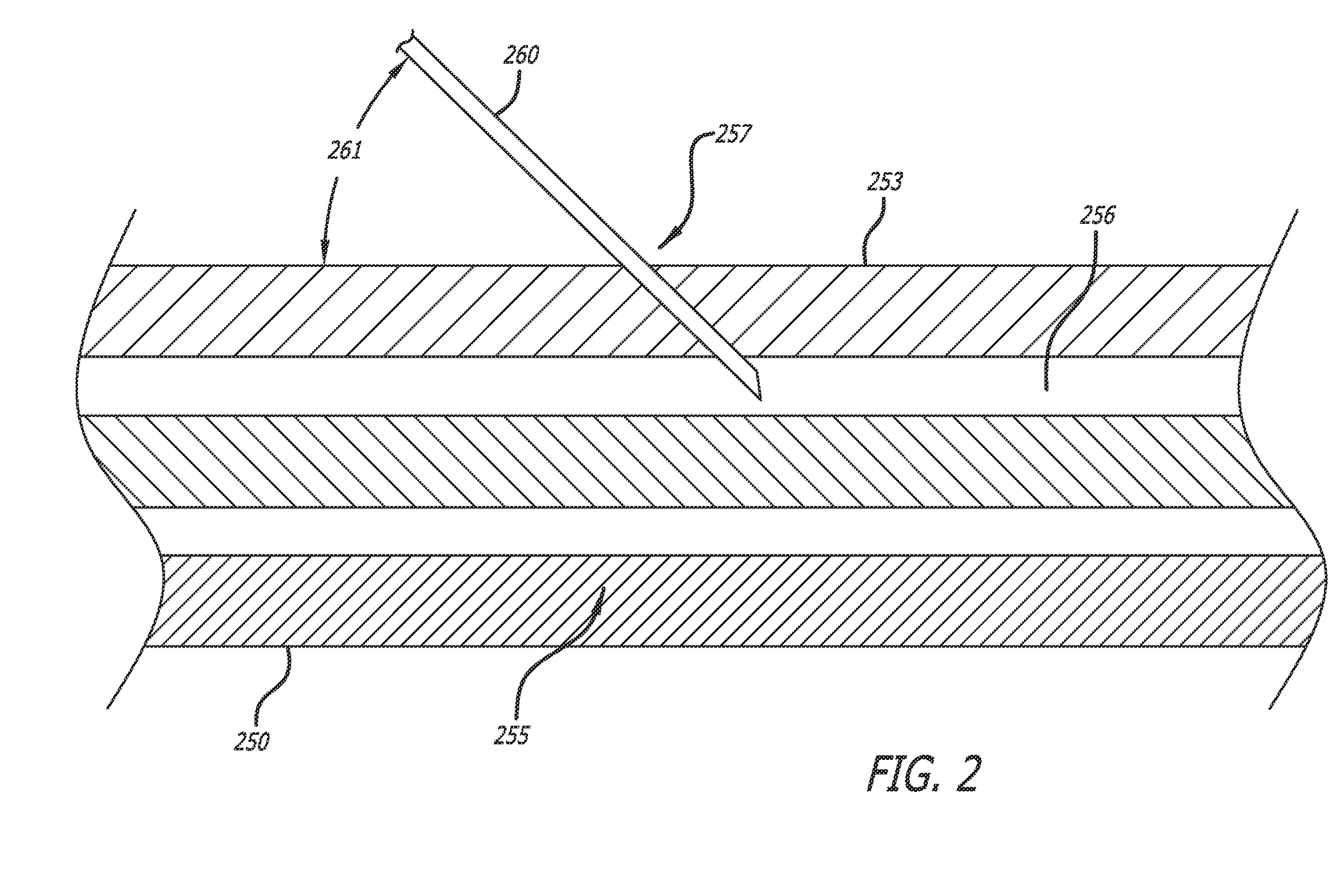
FIG. 2 illustrates a portion a portion of a vasculature extending along a limb of a patient, where a needle is inserted into a blood vessel, in accordance with some embodiments.

FIG. 2 illustrates a portion of a patient limb 250 having a vasculature 256 extending therealong. A needle 260 is shown inserted through a skin surface 253 at an insertion site 257 and further inserted into a target blood vessel 256 at an insertion site 257. As shown, the vasculature 255 includes more than one blood vessel available for access via the needle 260. In some embodiments, the DVA assessment may include indicating that one of the multiple blood vessels may be most easily accessed, i.e., the DVA assessment may indicate an optimum blood vessel, e.g., the target blood vessel 256, based on at least one of the 3D imaging data or the meta data. In some embodiments, the DVA assessment may also indicate an optimum angle of insertion 261 for the needle 260.

Figure 3:
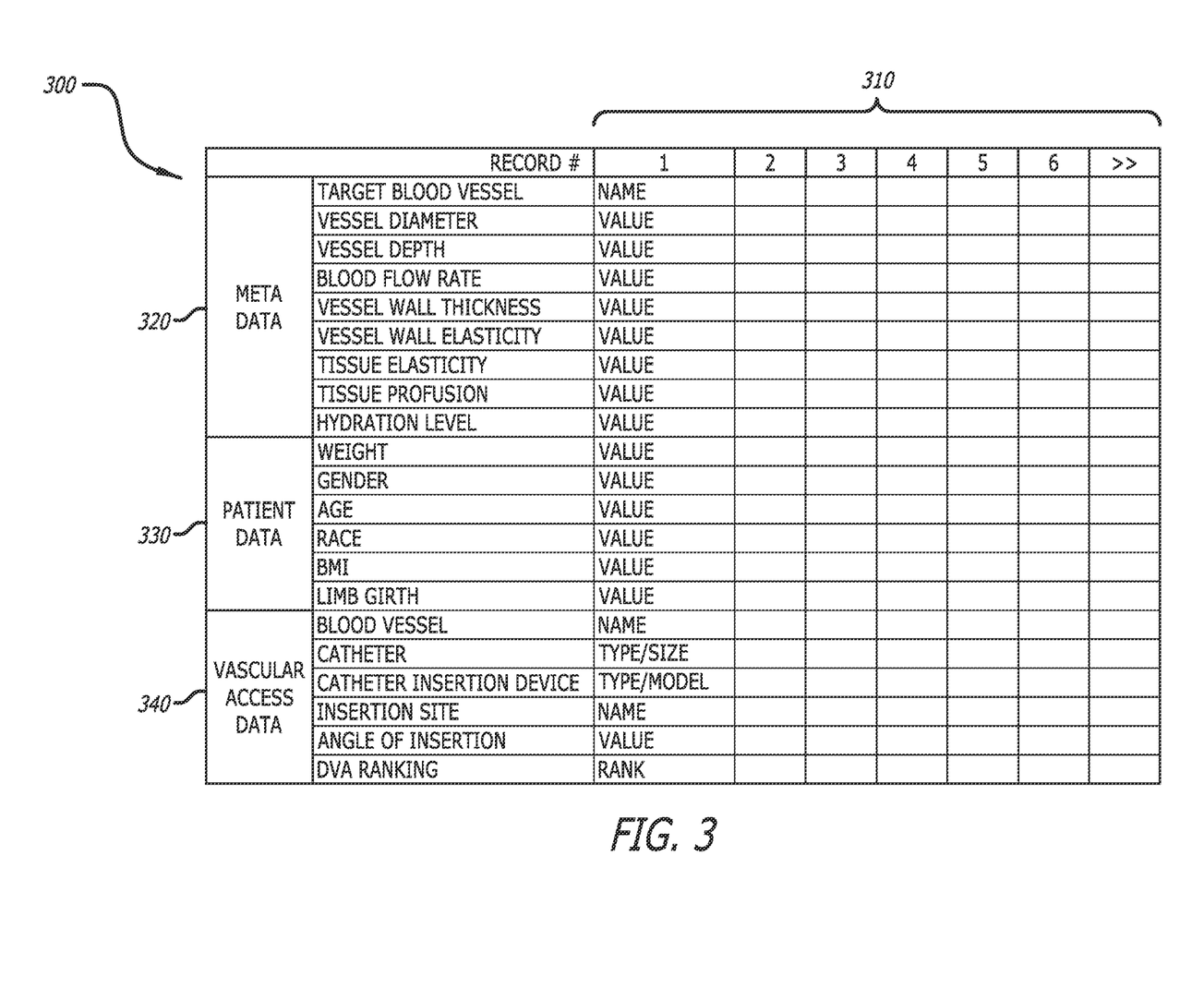
FIG. 3 illustrates an exemplary table of data utilized by logic performing machine learning techniques to define a trained ML model that correlates a difficult venous access (DVA) assessment to meta data pertaining to the vasculature, in accordance with some embodiments.

FIG. 3 illustrates an exemplary table 300 of the database 107, according to some embodiments. The table 300 includes a number (e.g., 10, 100, 1000, or more) of data sets (or records) 310 as received from the plurality of the systems 110 where each data set 310 may include data pertaining to a single vascular access/catheter insertion event for a specific patient. The data table 300 can include meta data 320, patient data 330 and/or vascular access data 340. In some embodiments, the patient data 330 may be omitted.

The meta data 320 may include the meta data described above as acquired by the device 150, such as the vessel diameter, vessel depth, blood flow rate, vessel wall thickness, vessel wall elasticity, tissue elasticity, tissue profusion, or the hydration level as shown in table 300. Of course, the meta data 320 may not be limited to the meta data shown and, in some embodiments, the meta data 320 may include only a subset of the meta data shown.

The patient data 330 may include the weight, gender, age, race, body mass index (BMI) for the specific patient. Of course, the patient data 330 may not be limited to the patient data shown. For example, additional patient data (not shown) may include blood pressure, medication, disease, or any other medical conditions of the patient. In some embodiments, the patient data 330 may include only a subset of the patient data shown. In some embodiments, the patient data 330 may be recorded in the EMR for the specific patient, and as such, the external computing device 60 may receive the patient data 330 from the EMR system 160.

The vascular access data 340 is data pertaining to the result of the vascular access/catheter insertion event which may constitute an independent DVA assessment, i.e. a DVA assessment resulting from the actual placement of the catheter. The vascular access data 340 may include the blood vessel accessed, the catheter (e.g., type and/or size) that was used, any catheter insertion device that was used, the insertion site, the angle of insertion, and a DVA score or ranking as shown in the table 300. Of course, in other embodiments, the vascular access data 340 may include more or less than the vascular access data shown. In some instances, the vascular access data 340 may be recorded in the EMR for the specific patient. As such, in some embodiments, the external computing device 60 may receive the vascular access data 340 from the EMR system 160.

The ML logic 109 is generally configured to apply the ML algorithm to the historical data to define a relationship between the meta data 320 (and, in some embodiments, the patient data 330) and the vascular access data 340. The ML logic 109 may then define the trained ML model based on the relationship, where the trained ML model is configured to indicate a difficulty in accessing the vasculature of an instant patient based on the meta data acquired from the instant patient. The DVA logic 119 is configured to acquire the instant meta data and apply the trained ML model to the instant meta data to determine an instant DVA assessment of the instant patient 50.

Figure 4:
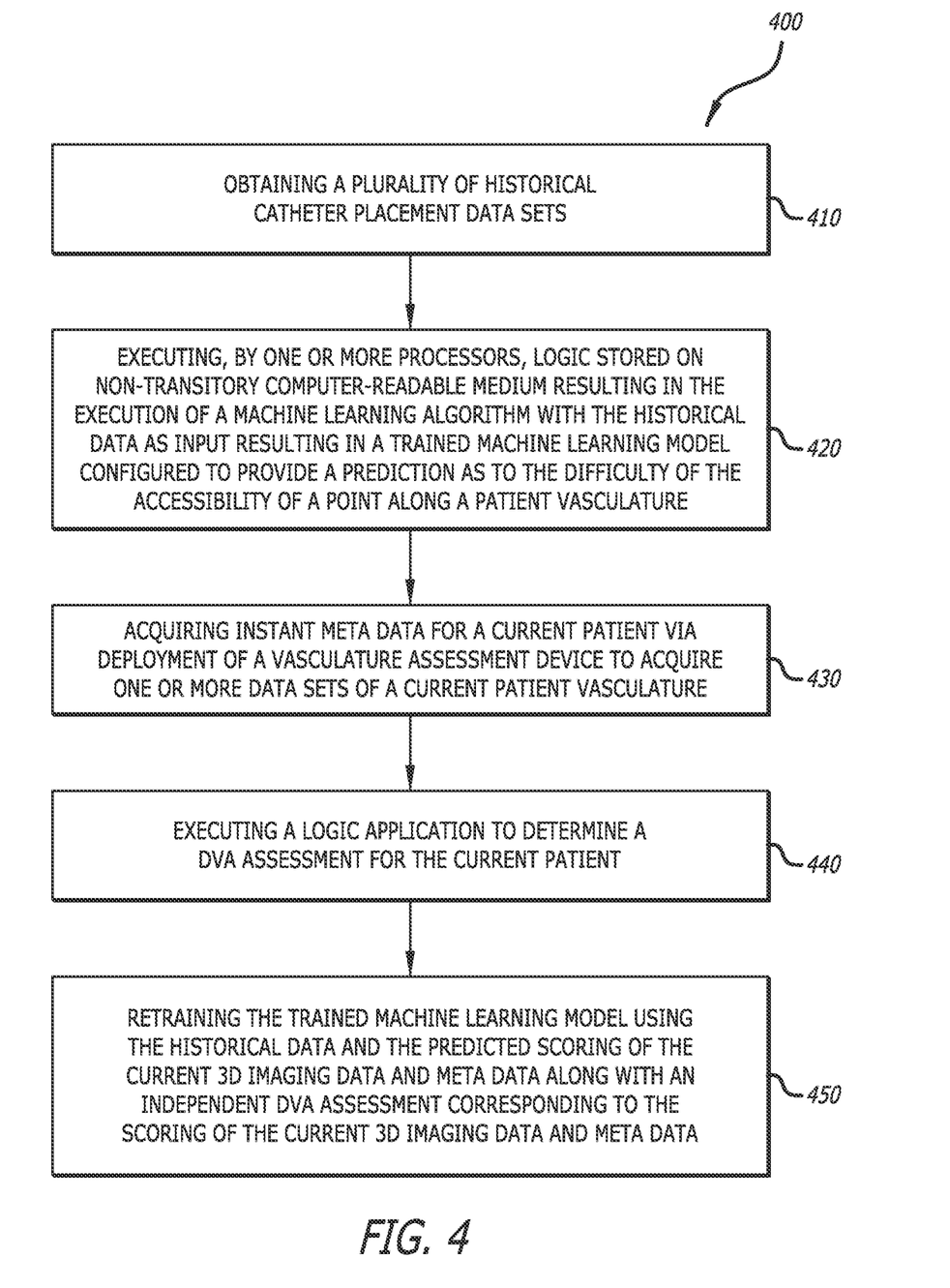
FIG. 4 illustrates a block diagram of a system method of determining a DVA assessment, in accordance with some embodiments.

FIG. 4 is a block diagram of a system method of determining a DVA assessment of a vasculature of a patient that, according to some embodiments, includes all or any subset of the following actions, steps, or processes. Each block illustrated in FIG. 4 represents an operation of the method 400 performed by a medical system disclosed herein, and typically as a result of execution of one or more logic modules disclosed herein as well as deployment of specific machines or devices, such as the vasculature assessment device 150, an ultrasound probe, etc. The method 400 may include obtaining a plurality of historical catheter placement data sets (block 410), where each data set includes 3D imaging data and meta data relating to a patient vasculature (collectively, a "data set"), where each data set originates from one or more of a plurality of medical systems, and where each medical system may acquire a separate "data set." Examples of medical systems are discussed above and include, but are not limited or restricted to, an ultrasound imaging system, an infrared imaging system, a molecular imaging system, a Raman spectroscopy system, and/or an optical coherence tomography system. Each medical system is configured to acquire the data set of a patient, e.g., prior to undergoing a catheter placement event, and each data set is associated with a final catheter insertion data set (sometimes referred to herein as vascular access data), e.g., recorded by a clinician, where the final catheter placement data set defines an independent DVA assessment. Thus, a medical system obtains a data set (3D imaging data and meta data) that is then associated with final catheter placement data set. The collection of the data set and associated final catheter placement data set with respect to block 410 may be considered historical data, that may be used in training a machine learning model discussed below or with analysis of future (non-historical) data sets through execution of certain heuristics. In some embodiments of the method 400, each medical system includes (i) a vascular assessment device that utilizes one or more of ultrasound imaging, infrared imaging, molecular imaging, Raman spectroscopy, or optical coherence tomography to acquire the raw image data and (ii) logic that when executed by processors determines medical data, which may include one or more of 3D imaging data and/or meta data from the raw image data.

The method 400 may further include executing, by one or more processors, logic stored on non-transitory computer-readable medium resulting in the execution of a machine learning algorithm with the historical data as input resulting in a trained machine learning model configured to provide a prediction as to the difficulty of the accessibility of a point along a patient vasculature (block 420). For instance, the processing of the historical data by the machine learning algorithm results in an automated weighting of various features (e.g., aspects of the 3D imaging data and meta data) in view of the catheter placement data such that future execution of the trained machine learning model taking current 3D imaging data and/or meta data as input will result in a score reflecting the difficulty in accessing a vasculature at the point along the vasculature corresponding to the 3D imaging data and meta data (e.g., representing whether, based on the historical data, a clinician would have obtained vasculature access at that point). In some embodiments of the method 400, the meta data may include one or more of a vessel diameter, a vessel depth, a blood flow rate, a vessel wall thickness, a vessel wall elasticity, a tissue elasticity, a tissue profusion, or a hydration level. The trained machine learning model may be stored in the memory 117 of the console.

The method 400 may further include acquiring instant raw image data and/or meta data for a current patient via deployment of a vasculature assessment device (such as the device 150) as a source of one or more data sets of a current patient vasculature (block 430), where each data set includes 3D imaging data and/or meta data relating to the current patient vasculature and originates from one or more of a plurality of DVA systems including or integrated with the vasculature assessment device. Following deployment of the vasculature assessment device resulting in acquisition of the raw image data and the conversion of the raw image data into 3D imaging data and meta data therefrom, the method 400 may further include executing a logic application to determine a DVA assessment for the current patient (block 440). Embodiments of determining the DVA assessment of the current patient are discussed herein and include the use of heuristics and/or machine learning techniques. For instance, the trained ML model may be applied to the instant 3D imaging data and/or meta data resulting in a score for a given point along the patient vasculature reflecting the difficulty in accessing the vasculature at that point. With brief reference to FIG. 5A, a plurality of points (dots) are illustrated along a vasculature such that the trained machine learning model may determine a score for each point. For example, in some embodiments, the trained ML model may be configured to assess points along the vasculature at a predetermined spacing, e.g., every three (3) inches along the length of the imaged vasculature or portion of the vasculature for which meta data was determined. In some embodiments of the method 400, the DVA assessment includes one or more of an insertion site or an angle of insertion.

In some embodiments, the method 400 further includes retraining the trained machine learning model using the historical data and the predicted scoring of the current 3D imaging data and meta data along with an independent DVA assessment corresponding to the scoring of the current 3D imaging data and meta data (e.g., an indication as to which point along the vasculature was accessed, and/or whether failure to access occurred at a particular point) (block 450). In some embodiments, the historical data will be assigned a first weight and the current 3D imaging data and meta data (with the independent DVA assessment as a label) will be assigned a second weight that is greater than the first weight. In some embodiments, no weighting is assigned (i.e., all data equally weighted). The retrained machine learning model may then be used to analyze future 3D imaging data and meta data.

FIG. 5A illustrates one exemplary screen shot 510 as may be portrayed on the display 112 as an output of the image logic 118 and/or the DVA logic 119. The screen shot 510 includes an image 511 (e.g., one example of the image 125 of FIG. 1) that includes a map of the vasculature 55 including a blood vessel 512. Also shown is a non-vascular anatomical element 513 (e.g., a bone) in relation to the blood vessel 512. As such, the clinician may visualize the blood vessel 512 in relation to the bone which the clinician may use as input in making vascular access decisions. Also shown are discreet locations along the blood vessel 512 as indicated by the circles, where the discreet locations may be possible access points (insertion sites) for the blood vessel 512.

Also shown in the screen shot 510 is a DVA report 520. The DVA report 520 includes meta data, such as the vessel depth and the vessel diameter. The DVA report 520 also includes various DVA outputs of the trained ML model when applied to the meta data. In the illustrated example, the DVA outputs include a suggested catheter size (e.g., 5 French) and a suggested insertion angle (e.g., 15 degrees). The DVA outputs also include a suggestion that no insertion tool is indicated as necessary to successfully access the blood vessel 512.

In some instances, a blood vessel may be relatively constant in size and accessibility over a defined length, such as the blood vessel 512, for example. As discussed above, the DVA logic 119 (or more specifically the trained ML model) may define DVA score (i.e., a ranking related to blood vessel access difficulty). According to one example, the score may be numerical, e.g., 1 to 10, where a score of 1 indicates easy or simple access and a score of 10 indicates difficult or complicated access. In the instant example, the DVA logic 119 has determined a DVA score for each of the discreet locations along the blood vessel 512 and the DVA score for each location is depicted in the image 511 adjacent each respective discreet location. In some embodiments, the DVA logic 119 may determine a composite DVA score for the blood vessel 512 and the composite DVA score may be included in the report 520.

FIG. 5B illustrates another exemplary screen shot 530 as may be portrayed on the display 112 as an output of the image logic 118 and/or the DVA logic 119. The screen shot 530 includes an image 531 that includes a map of the vasculature 55 including a blood vessels 532, 533, and 534. The map of the vasculature may enable to the clinician to visually observe any anomalies of the vasculature, such that the stenosis 534A of the blood vessel 534. Also shown are the discreet locations along the blood vessels 532, 533, and 534 as indicated by the circles. DVA report 540 includes meta data, such as the vessel depth and the vessel diameter. The DVA report 540 includes a suggested catheter size (e.g., 4 French) and a suggested insertion angle (e.g., 30 degrees). The DVA outputs also include a suggestion that a needle guide may be beneficial to successfully access the vasculature 55.

In this illustrated example, various DVA outputs are depicted in the image 531 along with the map of the vasculature 55. As shown, some meta data is indicated adjacent respective decreet locations, such as the DVA score, blood flow rate, and blood vessel diameter. In some embodiments, the imaging logic 118 and/or the DVA logic 119 may enable the clinician to the determine via input what meta data and/or DVA outputs will be depicted in the image 531 and/or the DVA report. ad show. Said another way, the imaging logic 118 and/or the DVA logic 119 may include filters that allow the clinician to turn on/off visibility of certain information.

In addition to or as alternative to depicting the DVA score #, the circles (or dots) may include other visually indicating elements, such as colors, shapes, borders, or X-outs, for example. For example, a dot that includes an "X" may indicate a location that is not recommended for access, and a dot that includes a border 536 may indicate a location that is recommended for access. Although not shown, the border 536 may also include a specific shape to indicate a preference. For example, a square shaped border may indicate a suggested first choice for access, a pentagon shaped border may indicate a suggested second choice for access, and a hexagon border may indicate a suggested third choice for access.

Other options not shown may include a binary indication method that includes a black dot to indicate locations that are not recommended for access and a white dot to indicate locations that are recommended for access. Similarly, a variable indication method may include a spectrum of colors (e.g. white-grey-black or green-yellow-red) according to the DVA score. For example, a white dot may indicate a DVA score below "4", a grey dot may indicate a DVA score of "4 to 7", and a black dot may indicate a DVA score above "7." While the above examples utilize colors or other visual indicators based on the DVA score, colors or any other indicia may be used to indicate specific aspects to the DVA assessment, such as blood flow rate, blood vessel depth, and/or blood vessel diameter, for example.

While the DVA report 520 of FIG. 5A relates to the blood vessel 512 as a whole (e.g., the DVA score is a composite score), the DVA report 540 may be related to a single decreet location, such as the location including the border 536 or any location as may be selected via input by the clinician. In other words, the system may enable to the clinician to view a DVA report for any discreet location by selecting the location.

FIG. 5C illustrates another exemplary screen shot 550 as may be portrayed on the display 112 as an output of the image logic 118 and/or the DVA logic 119. As alternative to indicating discreet locations, the image 551 illustrates the blood vessel 552 having the DVA score indicated variably (e.g., continuously) along the length of the blood vessel 552 depicted in the image 551. In other words, the blood vessel 552 (i.e., the image of the blood vessel 552) itself includes the spectrum of colors related to the DVA score. By way of one example, as illustrated, the color of the blood vessel image gradually transitions from white to grey to black as the DVA score changes from 1 to 10 along the length depicted. Similar to the example of FIG. 5B, the color of the blood vessel image may be related to the DVA score or a score of any specific aspect of the DVA assessment or meta data, which specific aspect or meta data may be chosen via input by the clinician. By way of a further example (not shown), the blood vessel image may include multiple discreet stripes extending along the length of the blood vessel image where each stripe includes a color spectrum in accordance a score of any specific aspect of the DVA assessment or meta data. The DVA report 560 includes meta data and/or DVA aspects or outputs that relate to a selected portion or location along the blood vessel image While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A medical system for identifying difficult venous access of a patient, comprising:
   a vascular assessment device configured to acquire raw image data of a vasculature of the patient; and
   a system module having a console coupled with the vascular assessment device, the console including a processor and a memory having logic stored thereon that, when executed by the processor, performs operations that include:
   receiving the raw image data from the vascular assessment device;
   determining meta data for the vasculature from the raw image data; and
   applying a trained machine learning, ML, model to the meta data to determine a difficult venous access, DVA, assessment for the vasculature.

2. The system according to claim 1, wherein the operations further include:
   determining three-dimensional, 3D, imaging data from the raw image data; and
   applying the trained ML model to the 3D imaging data in combination with the meta data to determine the DVA assessment.

3. The system according to claim 2, wherein the operations further include:
   determining a map of the vasculature from the 3D imaging data; and
   depicting the map of the vasculature on a display of the system module.

4. The system according to claim 1, wherein the vascular assessment device utilizes one or more of ultrasound imaging, infrared imaging, molecular imaging, Raman spectroscopy, or optical coherence tomography to acquire the raw image data.

5. The system according to claim 1, wherein the meta data includes one or more of a vessel diameter, a vessel depth, a blood flow rate, a blood flow direction, a vessel wall thickness, a vessel wall elasticity, a tissue elasticity, a tissue profusion, or a hydration level.

6. The system according to claim 1, wherein the operations further include providing a DVA assessment report to a clinician, the DVA assessment report including one or more of a subset of the meta data, a suggested catheter size, a suggested insertion angle, a suggested catheter insertion device, or a DVA score.

7. The system according to claim 6, wherein the suggested catheter insertion device is chosen from a list of catheter insertion devices stored in the memory.

8. The system according to claim 6, wherein:
   the system module is communicatively coupled with an automated or semi-automated catheter insertion device, and
   the operations include transmitting the DVA assessment to the automated or semi-automated catheter insertion device.

9. The system according to claim 1, wherein the system module is communicatively coupled with an electronic medical record, EMR, system such that the system module exchanges information with an EMR for the patient.

10. The system according to claim 9, wherein exchanging information with the EMR includes transmitting the DVA assessment to the EMR system.

11. The system according to claim 9, wherein the operations further include:
    receiving patient data for the patient from the EMR system, the patient data including at least one of a weight, a gender, an age, a race, or a body mass index of the patient; and
    applying the trained ML model to the patient data in combination with the 3D imaging data and the meta data to determine the DVA assessment.

12. The system according to claim 1, wherein the operations further include:
    identifying multiple locations along the vasculature;
    receiving the raw image data from the vascular assessment device for each identified location;
    determining meta data for each identified location; and
    applying the trained ML model to the meta data for each identified location to determine a DVA assessment for each identified location.

13. The system according to claim 1, wherein the system module is communicatively coupled with an external computing device having ML logic stored in memory that when executed by processors performs ML operations that include:
    receiving by the external computing device a plurality of historical DVA assessment data sets, each historical DVA assessment data set including:
      a DVA assessment originating from raw image data obtained by one of a plurality of vascular assessment devices from a historical patient; and
      an independent DVA assessment resulting from an actual placement of a catheter within the historical patient; and
    applying a ML algorithm to the plurality of historical DVA assessment data sets to define the trained ML model, wherein the operations further include receiving the trained ML model from the external computing device.

14. The system according to claim 13, wherein the external computing device is communicatively coupled with an electronic medical record, EMR, system, the ML operations further including receiving the independent DVA assessment from the EMR system.

15. The system according to claim 13, wherein the operations further include receiving the trained ML model from the external computing device.

16. A method of determining a difficult venous access, DVA, assessment of a vasculature of a current patient, comprising:
receiving a plurality of historical DVA assessment data sets, each historical DVA assessment data set including:
meta data and three dimensional, 3D, imaging data determined from raw image data acquired from a historical patient by a vascular assessment device of one of a plurality of DVA assessment systems; and
a corresponding independent DVA assessment resulting from an actual placement of a catheter within the historical patient, the corresponding independent DVA assessment recorded in an electronic medical record, EMR, for the historical patient;
applying a machine learning, ML, algorithm to the plurality of historical DVA assessment data sets to train an ML model that relates the meta data and 3D imaging data to the corresponding independent DVA assessment across the plurality of historical DVA assessment data sets;
acquiring, by the vascular assessment device of one of the plurality of DVA assessment systems, instant raw image data of the vasculature of the current patient;
determining instant meta data and instant 3D imaging data from the instant raw image data; and
applying the trained ML model to the instant meta data and the instant 3D imaging data to determine an instant DVA assessment of the vasculature of the current patient, the instant DVA assessment including a predicted scoring of the instant meta data and the instant 3D imaging data.

17. The method according to claim 16, wherein the vascular assessment device that utilizes one or more of ultrasound imaging, infrared imaging, molecular imaging, Raman spectroscopy, or optical coherence tomography to acquire the raw image data.

18. The method according to claim 16, wherein the meta data include one or more of a vessel diameter, a vessel depth, a blood flow rate, a vessel wall thickness, a vessel wall elasticity, a tissue elasticity, a tissue profusion, or a hydration level.

19. The method according to claim 16, wherein the DVA assessment includes one or more of a suggested catheter size, a suggested insertion angle, a suggested catheter insertion device, or a DVA score.

20. The method according to claim 16, further comprising retraining the trained ML model using the plurality of historical DVA assessment data sets and the predicted scoring of the instant meta data and the instant 3D imaging data and along with an independent DVA assessment corresponding to the predicted scoring of the instant meta data and the instant 3D imaging data.

* * * * *